United States Patent [19]
Sampson et al.

[11] 3,898,297
[45] Aug. 5, 1975

[54] ALKYL BENZENE ISOMERISATION PROCESS

[75] Inventors: Roy John Sampson; Alan Lewis Crowther; John Kenneth January, all of Stockton-on-Tees, England

[73] Assignee: Imperial Chemical Industries Limited, London, England

[22] Filed: Oct. 24, 1973

[21] Appl. No.: 409,318

[30] Foreign Application Priority Data
Oct. 24, 1972 United Kingdom............... 48926/72

[52] U.S. Cl............................................ 260/668 A
[51] Int. Cl.............................................. C07c 5/24
[58] Field of Search................................ 260/668 A

[56] References Cited
UNITED STATES PATENTS
3,078,318    2/1963    Berger ........................... 260/668 A
3,200,162    8/1965    Kawai ............................ 260/668 A

*Primary Examiner*—C. Davis
*Attorney, Agent, or Firm*—Cushman, Darby & Cushman

[57] ABSTRACT

A feedstock comprising at least one alkyl benzene is isomerised by contacting it with a flourided silica/alumina or preferably a fluorided alumina catalyst, in the presence of steam and/or of a hydrocarbon which is an alkane having 2 to 10 carbon atoms or a cyclic hydrocarbon in which at least 4, and preferably 5 or 6, carbon-carbon links in a ring are single bonds, any others being aromatic links.

12 Claims, No Drawings

ALKYL BENZENE ISOMERISATION PROCESS

This invention relates to an alkyl benzene isomerisation process.

According to the invention a feedstock comprising at least one alkyl benzene is isomerised by contacting it with a fluorided silica/alumina or preferably a fluorided alumina catalyst in the presence of steam and/or or a hydrocarbon which is either an alkane having 2 to 10 carbon atoms or a cyclic hydrocarbon in which at least 4, and preferably 5 or 6, carbon-carbon links in a ring are single bonds, any others being aromatic links.

The alkane preferably comprises at least one secondary hydrogen atom. It preferably has at least one tertiary hydrogen atom. It preferably has 2 to 6 carbon atoms and may be, for example, isobutane, isopentane or isohexane.

The cyclic hydrocarbon may advantageously have 5 to 14, and preferably 6 to 12, and more preferably 6 to 10, carbon atoms, and preferably has a six-membered ring which is preferably saturated. It may be a monocyclic or fused ring polycyclic hydrocarbon and may comprise alkyl or cycloalkyl substituents. Suitable cyclic hydrocarbons include the octahydroanthracenes, Tetralin, Decalin, cyclohexane, cyclohexyl cyclohexane, and their alkyl, especially $C_1$ to $C_4$ alkyl, substituted derivatives, for example methyl cyclohexane and the di-, tri- and tetra-methyl cyclohexanes, ethyl cyclohexane, ethylmethyl- and diethyl-cyclohexanes and isopropyl cyclohexane.

The hydrocarbon is preferably present in a concentration of 0.5 to 20%, and preferably 4 to 12%, by weight of the feedstock.

Whether or not hydrocarbon is present, the isomerisation is preferably carried out in the presence of steam, for example in a concentration of 50 to 10,000 and preferably 400 to 4,000 parts per million by weight of the feedstock. The steam may be introduced as steam or water or as a compound which reacts to give steam in situ, for example an alcohol having 1 to 10, and preferably 2 to 6, carbon atoms, for example tert-butanol, isopropanol, ethanol or cyclohexanol.

The catalyst may be produced by fluoriding, for example, an alumina which is at least partly in the gamma form. The alumina preferably has before fluoriding and preferably has after fluoriding, a surface area of 50 to 450, and more preferably 75 to 300, square metres/gram, its pore volume being preferably 0.3 to 1.8 cc/gram. Before fluoriding, the alumina may be calcined at, for example, 400° to 750°C for a period of 2 to 24 hours to convert it, at least in part, to gamma alumina. The catalyst may, if desired, be heated after fluoriding in nitrogen or air to a temperature of 200° to 550°C, optionally in the presence of a stream of inert gas, for example steam.

If the catalyst is a fluorided silica/alumina catalyst it may be crystalline but is very suitably amorphous. It preferably contains 7 to 40% by weight of alumina, the balance being substantially silica. It is preferred that the catalyst has a surface area in the range 50 to 700 square metres/gram and preferably 70 to 400 square metres/gram. The mean pore diameter of the catalyst is preferably in the range 10 to 400 A.

The alumina or silica/alumina may be fluorided by impregnation with aqueous hydrofluoric acid or a solution of an inorganic fluoride, for example an alkaline earth metal fluoride, or ammonium fluoride in, for example water, or boron trifluoride in, for example, acetic acid or ether, or by contact with hydrogen fluoride or a decomposable volatile fluorine-containing organic compound, e.g. carbon tetrafluoride, fluoroform, difluoromethane or a volatile inorganic compound, for example silicon tetrafluoride or boron trifluoride, in the vapour phase.

The alumina or silica/alumina may alternatively be fluorided in the course of an isomerisation reaction by adding to the feedstock a decomposable volatile fluorine-containing organic compound.

It is preferred that the fluorine content of the alumina catalyst should 1 to 10%, especially 1.5 to 7% by weight. It is preferred that the fluorine content of the silica/alumina catalyst should be 0.01 to 5% by weight, more preferably 0.05 to 1% by weight.

The catalyst may contain an alkali or preferably alkaline earth metal. In general there is some decline in activity if this is so which may in many cases be overcome, for example, by increasing the fluorine content or the temperature of isomerisation. However, there is, in general, improved selectivity in the isomerisation and the catalyst maintains its activity between regenerations rather better than in the case of catalysts in which the alkali or alkaline earth metal is absent. The metal may be introduced by impregnating the alumina or silica/alumina (before, during or after fluoriding) with a salt of the metal. The catalyst may comprise 0.02 to 5, and preferably 0.1 to 2% by weight of alkaline earth metal.

The isomerisation is preferably carried out at a temperature in the range 300° to 600°C, and more preferably 400° to 500°C, preferably at a pressure of 1 to 5 bars absolute. The time of contact of the feedstock with the fluorided alumina or silica/alumina catalyst under such conditions is normally in the range 0.1 seconds to 10 minutes, for example 1 to 10 seconds.

During use there is a tendency for carbonaceous deposits to build up on the catalyst and it is desirable periodically to regenerate the catalyst by contact with a gaseous stream comprising oxygen, preferably at a temperature in the range 400° to 600°C, and more preferably 450° to 550°C, for a period sufficient to remove a substantial proportion of the carbonaceous deposit, which period is normally in the range 5 minutes to 40 hours. If desired a small amount of a decomposable fluorine-containing organic compound may also be refluorided, for example after regeneration as previously described.

Water present in the product is readily separable by distillation, as may be the case also with low-boiling hydrocarbon additives.

It is preferred to isomerise dialkyl benzenes having at most 4 carbon atoms in each alkyl group, especially xylenes. The xylenes feedstock may, for example, be a mixture of metaxylene together with ethyl benzene, ortho- and/or paraxylene.

According to a preferred form of the invention a feedstock comprising one or more xylenes containing less than an equilibrium amount of paraxylene is isomerised to produce a product having a higher concentration of paraxylene.

In the production of paraxylene it is a common practice to separate paraxylene by cooling a mixture comprising paraxylene and at least one other xylene and/or ethyl benzene to crystallise it, separating the crystals (for example by filtering or centrifuging) and isomerising the mother liquor to increase its paraxylene concentration. The presence of a hydrocarbon in the isomerisation tends in subsequent cooling to result in the separation of more paraxylene by depressing the temperature at which eutectics of paraxylene are formed. The product of isomerisation may contain toluene and $C_9$ alkyl benzenes and it may be distilled to remove them. It is a feature of using as the cyclic hydrocarbon of this invention a trimethyl cyclohexane or ethyl cyclohexane, and to a lesser extent dimethyl cyclohexanes, that this distillation will not remove an undue amount of them as they boil in a similar range to the xylenes. On the other hand, it may be desired to limit the minimum temperatures attained in cooling by removing the hydrocarbon before the cooling step and in this case a cyclic hydrocarbon readily separable from xylene by distilling, for example cyclohexane, may be preferred. Cyclohexane may be separated by recovering a light ends fraction from the product of isomerisation, the fraction comprising benzene, toluene and cyclohexane, preferably distilling toluene from the fraction and separating cyclohexane in a substantially pure state by extractive distillation from the fraction. The extractive solvent may be, for example, phenol. However, if desired, a fraction consisting essentially of cyclohexane and benzene may be recovered by distillation and hydrogenated to give cyclohexane in a substantially pure state. This may be done at a temperature of 125° to 275°C, and at a total pressure of 10 to 40 bars in the liquid or vapour phase and in the presence of an aromatics hydrogenation catalyst, for example a nickel catalyst which is suitably Raney nickel or a supported nickel catalyst. The molar proportion of hydrogen to benzene may be in the range 5 : 1 to 20 : 1.

According to a further form of the invention a feedstock comprising one or more xylenes containing less than an equilibrium amount of orthoxylene is isomerised to produce a product having a greater concentration of orthoxylene.

If a xylenes isomerisation plant has stills for removing materials boiling above and below the xylenes range after isomerisation to leave a xylenes fraction (which may also contain ethyl benzene), and one or more xylenes are then separated from the xylenes fraction, the remainder of the fraction being isomerised to increase the concentration of the desired xylenes, the cyclic hydrocarbon may, if it can be distilled with the xylenes fraction, be introduced at any point in the system as a mixture with other hydrocarbons which separate with the materials boiling above and below the xylenes range.

EXAMPLES

Boehmite (poorly crystalline) was pelleted with 5% of an organic lubricant for pelleting sold under the trademark "Steratex" and then calcined in a stream of air by progressively heating during 3½ hours to 650°C and held at this temperature for 6 hours. These pellets were then fluorided by aqueous HF solution of a concentration appropriate to the degree of fluoriding indicated. After drying at 200°C pellets so prepared were used in Examples 1 to 4 and 6 to 8. After fluoriding they were in the form of a poorly crystalline, gamma- or eta-alumina as indicated by X-ray diffraction.

EXAMPLE 1

Para-xylene containing water and/or t-butanol in the amounts stated in Table 1 was passed through a fixed bed of pellets of a fluorided alumina catalyst. The catalyst (12 g.) contained 4.1% F (w/w) and was packed in a tubular glass reactor. Before use the catalyst was calcined in a stream of air at 450°C for 15 hours and was then purged with nitrogen. The feedstock was passed over the catalyst at 450°C at atmospheric pressure. The composition of the product is shown in Table 1.

TABLE 1

| RUN NO. | 1 | 2 | 3 |
|---|---|---|---|
| Feed Composition | | | |
| Water p.p.m. | 4 | 45 | 365 |
| t. butanol % w/w | 0 | 1 | 1 |
| Feed rate (g/hr.) | 49.0 | 46.0 | 48.0 |
| % in product of: | | | |
| paraxylene | 31.5 | 43.9 | 47.3 |
| metaxylene | 44.4 | 41.2 | 39.0 |
| orthoxylene | 12.4 | 8.3 | 7.4 |
| other aromatics (a) | 11.7 | 6.6 | 6.3 |
| % isomerisation (b) | 56.8 | 49.5 | 46.4 |
| (% metaxylene + orthoxylene in product) | | | |
| ratio a/b | 0.206 | 0.133 | 0.135 |

The results indicate that the presence of water and/or tert.butanol gives a greater selectivity of the reaction for isomerisation to xylenes rather than disproportionation.

EXAMPLE 2

Example 1 was repeated using a fluorided alumina catalyst containing 3.1% F, in the form of 3.4 mm. pellets using paraxylene feedstocks containing the additives shown in Table 2.

TABLE 2

| RUN NO. | 1 | 2 | 3 |
|---|---|---|---|
| Feed composition | | | |
| water p.p.m. | 340 | 340 | 6 |
| isopentane % w/w | 0 | 5 | 5 |
| Feed rate g/hr. | 94.6 | 92.0 | 76.6 |
| % in product of: | | | |
| paraxylene | 46.3 | 35.8 | 40.1 |
| metaxylene | 38.7 | 45.8 | 42.8 |
| orthoxylene | 8.1 | 13.3 | 11.9 |
| other aromatics (a) | 6.9 | 5.0 | 5.2 |
| % isomerisation (b) | 46.8 | 59.1 | 54.7 |
| ratio a/b | .148 | 0.085 | .095 |

The results show that the addition of isopentane with or without water leads to a greater selectivity of the reaction in producing xylenes rather than other aromatics.

EXAMPLE 3

Example 2 was repeated using a paraxylene feedstock containing 340 p.p.m. of water and isobutane where shown. The product composition is shown after the catalyst has been used for 6½ and 25 hours, and shows an improved retention of catalyst performance when the isobutane is present.

TABLE 3

| RUN NO. | 1 | | 2 | |
|---|---|---|---|---|
| iso-butane % w/w | nil | | 11.6 | |
| Catalyst time on line | 6½ hrs | 25 hrs | 6 hrs | 25 hrs |
| Feed rate g/hr. | 50.8 | 31.5 | 59.4 | 48.4 |
| % in product | | | | |

TABLE 3-Continued

| RUN NO. | 1 | | 2 | |
|---|---|---|---|---|
| Paraxylene | 35.6 | 47.8 | 42.5 | 53.1 |
| Metaxylene | 43.9 | 37.3 | 44.4 | 37.9 |
| Orthoxylene | 11.0 | 5.8 | 10.3 | 6.9 |
| Other aromatics (a) | 9.5 | 9.1 | 2.8 | 2.2 |
| % isomerisation (b) | 53.9 | 43.1 | 54.7 | 44.8 |
| ratio a/b | .177 | .21 | .051 | .049 |

EXAMPLE 4

A fluorided alumina containing 3.7% F by weight and a similar catalyst which had been impregnated with magnesium nitrate and calcined so as to contain magnesium (0.4%) the catalyst pellets being 3.4 mm. in diameter (12 g.) were each packed in a tubular reactor and calcined in air at 450°C for 15 hrs. and then purged with nitrogen. Para-xylene containing about 340 p.p.m. of water was then passed over the catalyst at 450°C. The results are summarised in Table 4.

TABLE 4

| RUN NO. | 1 | | 2 | |
|---|---|---|---|---|
| % Mg in catalyst | 0 | | 0.8 | |
| Catalyst time on line | Av 1st 6 hrs | 29 hrs | Av 1st 6 hrs | 29 hrs |
| Feed rate g/hr. | 100.0 | 32.2 | 42.2 | 15.5 |
| % product of | | | | |
| paraxylene | 42.0 | 51.9 | 46.0 | 49.0 |
| metaxylene | 40.9 | 35.0 | 40.4 | 37.8 |
| orthoxylene | 9.4 | 4.7 | 7.0 | 5.3 |
| other aromatics (a) | 7.7 | 8.4 | 6.4 | 7.9 |
| % isomerisation (b) | 50.3 | 39.7 | 47.4 | 43.1 |
| ratio a/b | .153 | .212 | .135 | .183 |

Although the initial activity of the magnesium containing catalyst was lower than that of the other catalyst its activity was well maintained. Also it leads to a more selective isomerisation.

EXAMPLE 5

A sample, 12.0 g. of a silica/alumina catalyst containing 10% alumina and having a surface area of 175 $m^2g^{-1}$, a pore volume of 0.49 $cm^3g^{-1}$ and a mean pore diameter of 11.2 nm. was placed in a tubular glass furnace and calcined in a stream of air at 550°C for 15 hours. It was then cooled to the reaction temperature, 450°C, in nitrogen. Orthoxylene containing 10.5% isobutane and saturated with water was passed over it for 6 hours.

The experiment was repeated under the same conditions with another sample of catalyst but without the isobutane. The weight of orthoxylene passed per hour and the composition of the liquid product in each case is given in the following table.

TABLE 5

| % w/w isobutane in feed | 10.5 | 0.0 |
|---|---|---|
| Weight of orthoxylene feed per hour (g) | 12.8 | 12.8 |
| % w/w in product of | | |
| paraxylene | 9.8 | 9.3 |
| metaxylene | 37.5 | 37.3 |
| other aromatics (a) | 2.6 | 4.2 |
| isomerisation (b) | 47.3 | 46.6 |
| ratio a/b | 0.056 | 0.09 |

These results show that the presence of isobutane greatly improves the selectivity for isomerisation without altering the amount of orthoxylene converted.

EXAMPLE 6

The isomerisation of paraxylene was followed on a series of 14 runs over a single sample of fluorided alumina catalyst. The catalyst, in the form of 3.2 mm. pellets, contained 3.0% fluorine and had a surface area of 214 $m^2g^{-1}$, a pore volume of 1.06 $cm^3g^{-1}$ and a mean pore diameter of 19.9 nm. The sample, 11.4 g. was packed in a tubular glass reactor, operated at atmospheric pressure. Before each run the catalyst was calcined in a stream of air at 450°C for 16 hours and then purged with nitrogen. Paraxylene, 99.2% pure, was passed over it, at the same temperature, for 6 hours; in runs 1 to 6 and 11 to 14 the paraxylene contained 340 p.p.m. water and in the others, 12 p.p.m. water. The following Table gives the feed rates used and the product compositions obtained in runs 1, 3, 6, 7, 8, 10, 11 and 14.

| RUN NO. | 1 | 3 | 6 | 7 | 8 | 10 | 11 | 14 |
|---|---|---|---|---|---|---|---|---|
| Water in feed (ppm) | 340 | 340 | 340 | 12 | 12 | 12 | 340 | 340 |
| Feed rate (ml.hr$^{-1}$ of liquid) | 23.8 | 22.6 | 26.4 | 22.4 | 18.0 | 16.8 | 16.7 | 17.2 |
| % in product of: | | | | | | | | |
| paraxylene | 34.8 | 37.8 | 40.7 | 41.7 | 37.9 | 38.6 | 33.3 | 34.3 |
| metaxylene | 43.6 | 42.8 | 41.7 | 40.9 | 42.1 | 41.4 | 44.1 | 43.3 |
| orthoxylene | 11.2 | 10.6 | 9.7 | 8.9 | 9.8 | 9.2 | 11.2 | 11.4 |
| other aromatics (a) | 10.4 | 8.8 | 8.0 | 8.4 | 10.1 | 10.8 | 11.4 | 11.0 |
| % isomerisation (b) | 54.8 | 53.4 | 51.4 | 49.8 | 51.9 | 50.6 | 55.3 | 54.7 |
| Ratio a/b | 0.189 | 0.165 | 0.155 | 0.168 | 0.195 | 0.213 | 0.206 | .201 |

The results taken together show that water has a favourable effect on the activity and selectivity of the catalyst.

In the presence of 340 p.p.m. water (runs 1–6) the activity is approximately constant whilst some improvement of selectivity is obtained as the number of runs increases. Changing to dry feed results in the immediate loss of activity and increasing loss of selectivity, as the number of dry xylene feed runs increases. The reintroduction of wet feed results in the improvement in selectivity and activity and stabilisation of performance.

EXAMPLE 7

12 g. of a fluorided alumina catalyst, containing 3.7% fluorine and having a surface area of 195 $m^2g^{-1}$, a pore volume of 0.93 $cm^3g^{-1}$ and a mean pore diameter of 19.1 nm, were charged to a tubular glass reactor and calcined in a stream of air, at 450°C and purged with nitrogen. Paraxylene (99.2% pure, saturated with water) was passed over the catalyst at 450°C for 6 hours. The catalyst was again calcined as before and paraxylene containing 11.6% isobutane was passed over it at the same temperature. The feed rates used and the compositions of the de-isobutanised product formed at 1 hour and 6 hours on line in each case are given in the following table.

| Feed | Paraxylene | | Paraxylene + 11.6% isobutane | |
|---|---|---|---|---|
| Feed rate (mls hr⁻¹) of liquid) | 74.8 | | 68.2 | |
| Sample time (hr) | 1 | 6 | 1 | 6 |
| % in product of: | | | | |
| paraxylene | 37.4 | 50.2 | 37.3 | 42.4 |
| metaxylene | 43.3 | 37.1 | 47.0 | 44.4 |
| orthoxylene | 11.1 | 6.8 | 12.5 | 10.3 |
| other aromatics | 8.3 | 5.9 | 3.2 | 2.8 |
| % isomerisation | 54.4 | 43.9 | 59.5 | 54.7 |
| by-product make | 0.15 | 0.13 | 0.05 | 0.05 |
| isomerisation isomerisation at 6 hrs. isomerization at 1 hr. | | 0.81 | | 0.92 |

No products attributable to isobutane were found in the liquid products.

The results show that the presence of isobutane substantially reduced the by-product make and retarded the rate of decay in activity with little effect on the initial activity.

EXAMPLE 8

200 g. of γ-alumina formed into 3 mm. pellets having a surface area of 214 $m^2g^{-1}$, a pore volume of 1.06 $cm^3g^{-1}$ and a mean pore diameter of 19.8 nm. was shaken with 212 mls. of a 3% w/w aqueous solution of hydrogen fluoride for 30 minutes at ambient temperature. It was then dried at 200°C for 6 hours.

12 g. of the dry catalyst were charged to a tubular glass reactor and calcined in a stream of air at 550°C for 16 hours. It was cooled in nitrogen to 450°C and paraxylene, 99.2% pure saturated with water, passed over it for 6 hours during which time the effluent was analysed every 30 minutes. It was then calcined again under the same conditions as before, and, on cooling to 450°C, paraxylene which had been saturated with water at room temperature, and containing approximately 300 p.p.m. of water, and also containing 5% v/v cyclohexane was passed over it for 6 hours at substantially atmospheric pressure.

The average product compositions obtained with the two feedstocks are given in the following table:

TABLE 8

| Feed Composition | 99% Paraxylene | Paraxylene + 5% Cyclohexane |
|---|---|---|
| Flow rate (mls hr⁻¹) | 20.6 | 20.4 |
| % in product of | | |
| paraxylene | 40.3 | 41.5 |
| metaxylene | 43.0 | 44.3 |
| orthoxylene | 7.5 | 8.2 |
| toluene + trimethyl benzene | 9.2 | 6.0 |
| isomerisation conversion | 50.5 | 52.5 |

It is clear that in the presence of cyclohexane significantly less toluene and trimethyl benzene are produced.

EXAMPLE 9

The isomerisation of para-xylene was followed on a series of 12 runs over a single sample of fluorided alumina. The catalyst was prepared from ⅛ inch pellets which had a surface area of 267 $m^2$/gram and a pore volume of 1.08 ccs/grm, and contained 2.8% fluorine. The sample, 12 g., was packed in a tubular glass reactor, operated at atmospheric pressure. Before each run the catalyst was calcined in a stream of air at 450°C for 16 hrs. and then purged with nitrogen. Paraxylene containing feeds were passed over the catalyst at 450°C for 6 hours. The composition of the feed, feed rate and product composition are shown in Table 9 for runs 3, 4, 5, 9, 10 and 11.

| RUN NO. | 3 | 4 | 5 | 9 | 10 | 11 |
|---|---|---|---|---|---|---|
| Feed Composition | | | | | | |
| Water p.p.m. | 6 | 6 | 6 | sat | sat | sat |
| Cyclohexane % w/w | 15 | — | 1.5 | 1.5 | — | 15 |
| Feed rate g/hr. | 29.2 | 42.9 | 47.9 | 55.6 | 55.6 | 46.2 |
| % Product | | | | | | |
| paraxylene | 31.1 | 37.3 | 37.7 | 41.3 | 41.9 | 38.7 |
| metaxylene | 46.9 | 42.4 | 43.5 | 42.1 | 41.2 | 46.2 |
| orthoxylene | 16.5 | 11.1 | 11.9 | 11.1 | 10.1 | 12.9 |
| other aromatics (a) | 4.5 | 9.2 | 6.9 | 5.5 | 6.8 | 2.2 |
| % isomerisation (b) | 63.4 | 53.5 | 55.4 | 53.2 | 51.3 | 59.1 |
| ratio a/b | .071 | .172 | .125 | .103 | .133 | .037 |

It can be seen by comparison of run 3 with 4 that the addition of cyclohexane has a favourable effect upon the selectivity of the isomerisation. Comparison of run 9 with 10 and run 11 with run 10 show that addition of cyclohexane to water-saturated xylenes feed leads to improved xylene isomerisation selectivity. Comparison of runs 3 and 5 with runs 9 and 11 shows that better selectivities are obtained with water-saturated xylene feed.

EXAMPLE 10

The isomerisation of para-xylene was followed on a series of 14 runs over a single sample of fluorided silica alumina. The catalyst had a surface area of 109 $m^3$/g and a pore volume of 0.50 cc/grm. by immersion in aqueous hydrofluoric acid at ambient temperature, and then heating at 200°C for 6 hours. The catalyst contained 0.2% w/w fluorine and was tested at atmospheric pressure.

Prior to each run the catalyst was calcined at 550°C in air for 16 hours and then purged with nitrogen. Paraxylene containing feeds were passed over the catalyst for 6 hours. The composition of the feed, feed rate and product composition are shown in Table 10.

TABLE 10

| RUN NO | 1 | 3 | 4 | 9 | 10 | 11 | 12 | 13 | 14 |
|---|---|---|---|---|---|---|---|---|---|
| Feed Composition | | | | | | | | | |
| Water ppm | 6 | 6 | 6 | sat | sat | sat | sat | sat | sat |
| Cyclohexane % w/w | — | — | 7.5 | — | — | — | — | 7.5 | — |
| Feed rate g/hr. | 9.4 | 7.8 | 12.9 | 9.0 | 8.8 | 9.1 | 9..4 | 8.2 | 10.3 |
| % Product | | | | | | | | | |
| paraxylene | 43.4 | 45.0 | 50.0 | 46.4 | 45.7 | 43.9 | 42.2 | 42.4 | 44.5 |
| metaxylene | 37.6 | 35.7 | 38.7 | 35.9 | 36.3 | 37.7 | 38.8 | 43.9 | 38.2 |
| orthoxylene | 7.2 | 6.6 | 7.6 | 6.4 | 6.7 | 7.1 | 7.8 | 9.2 | 6.9 |
| other aromatics (a) | 11.8 | 12.7 | 3.7 | 11.3 | 11.3 | 11.3 | 11.2 | 5.5 | 10.4 |
| % isomerisation (b) | 44.8 | 42.3 | 46.3 | 42.3 | 43.0 | 44.8 | 46.6 | 53.1 | 45.1 |
| ration a/b | 0.263 | 0.300 | .080 | .267 | .263 | .252 | .240 | .104 | .231 |

It can be seen that with dry feed, activity and selectivity decrease with time from runs 1 to 3. The addition of cyclohexane to dry feed increases the activity and selectivity as can be seen from comparing runs 3 and 4. The use of water saturated xylenes leads to a gradual increase in selectivity and activity as can be seen from comparing runs 9 to 12. Addition of cyclohexane to water-saturated xylenes leads to improved selectivity, as can be seen by comparing runs 13 with 12 and 14.

EXAMPLE 11

A catalyst was prepared from alumina spheres (5 × 8) which had a surface area of 211 m$^2$/g and a pore volume of 0.84 ccs/grm by impregnating with magnesium nitrate solution, drying at 200° prior to immersing with hydrofluoric acid solution, and finally drying at 200°C. The catalyst contained 3.9% F and 1.55% Mg.

The catalyst (12 g) was placed in a glass tubular reactor and the isomerisation of para-xylene followed on a series of seven experiments. Prior to each run the catalyst was calcined at 450°C in air for 16 hours and then purged with nitrogen. Para-xylene containing feeds were passed over the catalyst for 6 hours. The composition of the feed, feed rate and product composition are shown in Table 11. The experiments were at atmospheric pressure.

TABLE 11

| RUN NO. | 1 | 2 | 3 | 4 | 5 | 6 | 7 |
|---|---|---|---|---|---|---|---|
| Feed Composition | | | | | | | |
| Water ppm | 19 | 19 | 19 | 19 | sat | sat | sat |
| Cyclohexane % w/w | — | — | 1.5 | — | — | — | 15 |
| Feed rate g/hr. | 31.9 | 33.1 | 32.5 | 33.0 | 24.0 | 24.0 | 15.4 |
| % Product | | | | | | | |
| paraxylene | 39.5 | 44.5 | 46.1 | 52.8 | 44.1 | 43.9 | 39.3 |
| metaxylene | 42.4 | 40.5 | 41.2 | 35.6 | 40.6 | 40.8 | 45.8 |
| orthoxylene | 11.2 | 9.4 | 9.5 | 6.8 | 9.9 | 10.1 | 13.2 |
| other aromatics (a) | 6.9 | 5.6 | 3.2 | 4.8 | 5.4 | 5.2 | 1.7 |
| % isomerisation (b) | 53.6 | 49.9 | 50.7 | 42.4 | 50.5 | 50.9 | 59.0 |
| ratio a/b | .129 | .112 | .063 | .113 | .106 | .102 | .029 |

It can be seen that activity and selectivity are decreasing with dry para-xylene feed (runs 1 and 2) and that addition of cyclohexane to the dry para-xylene feed (run 3) leads to improved selectivity. The use of water-saturated para-xylene feed leads to improved selectivity, which is further increased by the addition of cyclohexane.

EXAMPLE 12

A catalyst was prepared from alumina ⅛ inch pellets (surface area 204 m$^2$/grm; pore volume 1.10 ccs/grm) and contained 7.9% F. The catalyst (12 g) was packed in a tubular glass reactor and was calcined in a stream of air at 450°C for 16½ hours and then purged with nitrogen. Water-saturated para-xylene (119 g/hr.) was passed over the catalyst at 450°C and atmospheric pressure for 6 hours. The product contained 43.1% para-xylene, 39.3% meta-xylene, 8.9% ortho-xylene and 8.7% orther aromatics.

EXAMPLE 13

A catalyst was prepared from ⅛ inch alumina pellets (surface area 267 m$^2$/g and pore volume 1.08 ccs/grm) by impregnating with 3.1% wt/vol. solution of ammonium fluoride and drying at 200°C. The catalyst (12 g.) contained 3.1% F (w/w), was packed in a tubular glass reactor, and was calcined in a stream of air at 450°C for 16 hrs. then purged with nitrogen prior to use. Water-saturated para-xylene was passed over the catalyst at 450°C and atmospheric pressure for 6 hours. The product contained 37.2% para-xylene, 44.8% meta-xylene, and 10.1% ortho-xylene and 7.9% other aromatics.

EXAMPLE 14

Alumina spheres (5 × 8) (12 g) (surface area 211 m$^2$/grm, pore volume 0.84ccs/g) were calcined with a nitrogen stream at 450°C for 16 hours in a tubular glass reactor. The alumina was then fluorided by passing 1,1-,1,-trifluoro-2-chloro-ethane at a rate of 11 litres/hr. for 10 minutes at 320°C.

A series of experiments were then carried out with this catalyst. Prior to each run the catalyst was calcined in a stream of air at 450°C for 16 hours and then purged with nitrogen. Water-saturated orthoxylene-containing feeds were passed over the catalyst at 450°C for 6 hours. The composition of the feed, the feed rate and product composition are shown in Table 12.

TABLE 12

| RUN NO. | 1 | 7 | 8 |
|---|---|---|---|
| Feed Composition | | | |
| 1,1,1,-trifluoro-2-chloro-ethane ppm | nil | 250 | 250 |
| feed rate mls/hr. | 27.8 | 85.4 | 82.7 |
| % Product | | | |
| paraxylene | 10.4 | 7.7 | 9.2 |
| meta-xylene | 40.1 | 35.1 | 37.6 |
| orthoxylene | 47.6 | 56.0 | 51.8 |
| other aromatics (a) | 1.9 | 1.2 | 1.4 |
| % isomerisation (b) | 50.1 | 42.8 | 46.8 |

It can be seen that an effective catalyst can be prepared using 1,1,1,-trifluoro-2-chloro-ethane as fluoriding agent. Also the addition of 1,1,1,-trifluoro-2-chloro-ethane to the ortho-xylene feed increases the amount of isomerisation as shown by runs 7 and 8.

EXAMPLE 15

A catalyst was prepared by impregnating ⅛ inch alumina pellets (surface area 196 m²/g, pore volume 1.13 ccs/grm) with calcium acetate solution, drying at 200°C in air, immersing the pellets in aqueous hydrofluoric acid solution and drying at 200°C in air. The catalyst contained 0.33% Ca and 2.8% F. The catalyst (12 g) was placed in a glass tubular reactor and calcined in air at 450°C for 16½ hours and then purged with nitrogen. A water-saturated para-xylene feed (28.2 g/hr.) was passed over the catalyst for 6 hours and gave a product which contained 38.1% para-xylene, 44.6% meta-xylene, 9.3% orthoxylene and 8.1% other aromatics. The experiment was carried out at atmospheric pressure.

EXAMPLE 16

An alumina catalyst containing 2.2% F with a surface area of 210 m²g⁻¹ and a pore volume of 1.02 cm³g⁻¹ (12 g.) was placed in a glass reactor and calcined in air at 550°C for 15 hours. The reactor was then purged with nitrogen and the temperature reduced to 450°C. Orthoxylene containing about 330 p.p.m. of water (31.2 ml/hr.) was then fed at atmospheric pressure for 6 hours and the product contained para-xylene (12.6% by weight), meta-xylene (45.5% by weight) and toluene (1.7% by weight) plus some trimethyl benzenes.

We claim:

1. A process for isomerizing an alkyl benzene which consists essentially of contacting a feedstock comprising at least one alkyl benzene with a catalyst selected from the group consisting of fluorided silica/alumina, fluorided alumina, fluorided silica/alumina containing an alkali or alkaline earth metal and fluorided alumina containing an alkali or alkaline earth metal in the presence of steam and/or of a hydrocarbon which is either an alkane having 2 to 10 carbon atoms or a cyclic hydrocarbon in which at least four carbon-carbon links in a ring are single bonds, any other being aromatic links.

2. A process as claimed in claim 1 in which the feedstock is contacted in the presence of a cyclic hydrocarbon having 5 to 14 carbon atoms.

3. A process as claimed in claim 2 in which the cyclic hydrocarbon is selected from the octahydroanthracenes, Tetralin, Decalin, cyclohexane, cyclohexyl cyclohexane, methylcyclohexane and the di-, tri- and tetramethyl cyclohexanes, ethyl cyclohexane, ethylmethyl- and diethyl-cyclohexanes and isopropyl cyclohexane.

4. A process as claimed in claim 1 in which the feedstock is contacted in the presence of an alkane having 2 to 6 carbon atoms.

5. A process as claimed in claim 1 in which the hydrocarbon is present in a concentration in the range of 0.1 to 20% by weight of the feedstock.

6. A process as claimed in claim 1 in which the feedstock is contacted in the presence of steam having a concentration in the range 50 to 10,000 parts per million by weight of the feedstock.

7. A process as claimed in claim 1 in which the alumina or silica/alumina has been fluorided by impregnation with an agent selected from aqueous hydrofluoric acid, an inorganic fluoride, ammonium fluoride, and boron trifluoride.

8. A process as claimed in claim 1 in which the alumina or silica/alumina has been fluorided by contact in the vapor phase with an agent selected from hydrogen fluoride, a decomposable volatile fluorine-containing organic compound, a volatile inorganic compound.

9. A process as claimed in claim 1 in which the fluorine content of the catalyst lies in the range 1 to 10% by weight when alumina and in the range 0.01 to 5% by weight when silica/alumina.

10. A process as claimed in claim 1 in which the feedstock comprises at least one xylene.

11. A process as claimed in claim 10 in which the feedstock comprises one or more xylenes containing less than an equilibrium amount of para-xylene and in which the product has a higher concentration of para-xylene.

12. A process as claimed in claim 1 in which the isomerisation is conducted at a temperature in the range 300° to 600°C, at a pressure of 1 to 5 bars absolute, and in which the time of contact of feedstock with catalyst lies in the range 0.1 seconds to 10 minutes.

* * * * *

UNITED STATES PATENT OFFICE
CERTIFICATE OF CORRECTION

Patent No. 3,898,297　　　　　　　Dated August 5, 1975

Inventor(s) Roy John Sampson et al

It is certified that error appears in the above-identified patent and that said Letters Patent are hereby corrected as shown below:

IN THE TITLE PAGE:

At Section [75] add the following to the list of inventors

--IVAN JAMES SAMUEL LAKE--.

IN THE SPECIFICATION:

Column 1, line 8, "and/or or" should read --and/or of--.

Column 2, line 47, insert after "may" --be included in the gaseous stream. The catalyst may--.

Column 10, line 16, "orther" should read --other--.

Signed and Sealed this twentieth Day of January 1976

[SEAL]

Attest:

RUTH C. MASON
*Attesting Officer*

C. MARSHALL DANN
*Commissioner of Patents and Trademarks*